G. H. WARING.
PROCESS FOR THE MANUFACTURE OF GAS.
APPLICATION FILED JUNE 20, 1910.
982,754.
Patented Jan. 24, 1911.
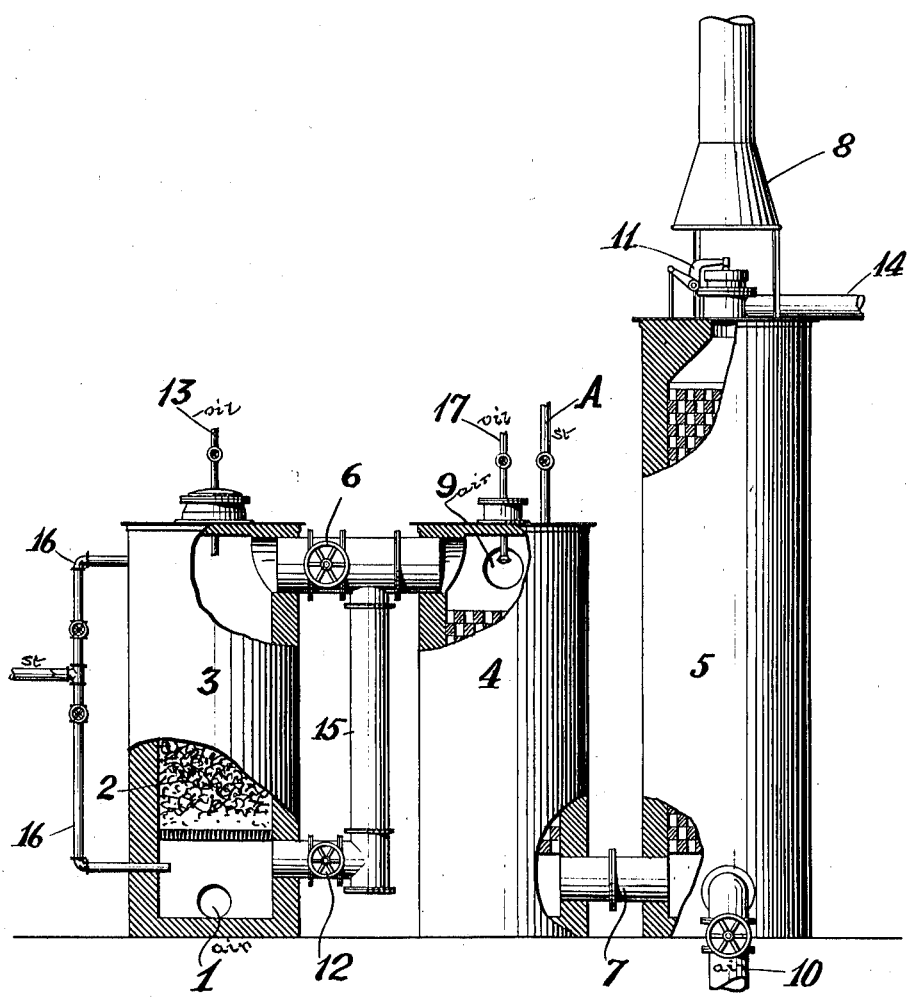
WITNESSES:
INVENTOR
George H. Waring
BY
Augustus B. Stoughton
ATTORNEY

UNITED STATES PATENT OFFICE.

GEORGE H. WARING, OF OMAHA, NEBRASKA, ASSIGNOR TO THE UNITED GAS IMPROVEMENT COMPANY, OF PHILADELPHIA, PENNSYLVANIA, A CORPORATION OF PENNSYLVANIA.

PROCESS FOR THE MANUFACTURE OF GAS.

982,754.　　　　　　Specification of Letters Patent.　　Patented Jan. 24, 1911.

Application filed June 20, 1910. Serial No. 567,813.

*To all whom it may concern:*

Be it known that I, GEORGE H. WARING, a citizen of the United States, residing in Omaha, in the county of Douglas and State of Nebraska, have invented certain new and useful Improvements in Processes for the Manufacture of Gas, of which the following is a specification.

The principal object of the present invention is to provide an economical and commercially satisfactory process of manufacturing, by the decomposition of oil, tar or the like, gas of varying predetermined quality or specific gravity and adapted for a variety of uses and purposes, without the emission into the atmosphere of undesirable smoke or fumes.

Generally stated the process consists in alternately passing air, with or without steam, through a burning fuel bed to heat it and generate combustible gas in a generator and passing off said gas to and burning it with secondary air in a chamber or chambers to heat the latter and intermittently passing oil tar or the like down through the hot fuel bed to generate and partly decompose oil vapors, and finishing the decomposition of the oil vapors and the manufacture of the oil gas by passing said vapors through said pre-heated chamber or chambers.

The invention in addition to the above process comprises additional improvements which will be hereinafter described and claimed.

By the process of my invention oil gas may be produced of widely different quality of specific gravity so that the oil gas can be made to serve for power use or other special use such as for balloons, or it can be so made as to constitute a proper gas for enrichment and the production of carbureted illuminating gas; in fact the composition of the oil gas is under the control of the maker and can be varied widely to suit almost any requirements. Furthermore in the manufacture of gas by the decomposition of oil or tar by the process of this invention there are not emitted undesirable smoke or fumes and the process is economical in respect to fuel consumption and cost of apparatus, because waste heat from heating the fuel bed is stored and then utilized in assisting to decompose the oil or oil vapors which may pass through the fuel bed.

In order to further describe the invention reference will be made to the accompanying drawings, showing one but not the only type of apparatus in connection with which it can be practiced. Those drawings illustrate, partly in section and partly in elevation, the apparatus referred to.

The process may be described in two stages, which are repeated. The first stage or step consists in passing air as by the air pipe 1 through a burning bed of fuel 2 to heat it and generate a combustible gas and then passing said gas from the generator 3, where it was made, to and burning it with secondary air in chambers as 4 and 5 to heat the same. It has been found from practical experience in the operation of this process that to preserve the fuel bed free from clinkers and prevent other troubles, it may be advisable to admit some steam (for example by way of 16) mixed with the air passed through the fuel bed; this steam will be in large part decomposed with resulting formation of "blue" water gas, which water gas will, however, be burned with the secondary air in chambers 4 and 5, and thus not wasted but utilized. The gas generated in the manner described in the generator 3 may be led by the valved connection 6 to the top of the chamber 4 and thence by the pipe 7 to the bottom of the chamber 5, from the top of which it may escape, or perhaps more accurately, the products of combustion may escape to the atmosphere through the stack 8. Secondary air is admitted to the chambers by the connections 9 and 10, so as to bring about the combustion referred to.

At the close of the first stage, the air supply through connections 1, 9 and 10, may be shut off and then either steam from the connection 16 passed up or down, with proper respective adjustment of valves 6 and 12,— through the fuel bed to form water gas, or steam admitted by the connection A to the top of the vessel 4, this water gas formed or steam admitted being sufficient in quantity to fill the entire apparatus and thus purge all worthless products of combustion into the atmosphere, before the valve 11 is closed and the making of oil gas in stage two begins.

Prior to the second stage of the process the secondary air must be shut off as also the air connection at 1, the valve in the connection 6 must be closed as also the stack valve 11 and the valve in the connection 12 must be opened. The second stage or step then consists in passing oil or tar down through the hot fuel bed 2, as by the connection 13, to decompose it and generate and partly decompose oil vapors and finishing the decomposition of the oil vapors and the manufacture of the oil gas by passing said vapors through the preheated chambers 4 and 5 and thence through the offtake 14 for use or storage. The partly decomposed oil vapors pass from the generator 3 by way of the connections 12 and 15 to the chamber 4. The temperature to which the chambers 4 and 5, or perhaps more accurately, the checker-brick work contained therein, is heated is comparatively high; for example above 1400° F. and is high enough to finish the decomposition of oil vapors which is not finished in the fuel bed and to convert such vapors into an oil gas. In completing the second stage, after shutting off the supply of oil at 13, any of the following procedures may be adopted to purge from the apparatus into the gas holder the valuable oil or oil gas remaining in the apparatus. After opening valve 6 and closing valve 12, blast may be admitted through 1 up through the fuel bed, this blast being sufficient in amount to completely fill the apparatus up to the stack valve 11; or, steam may be admitted by connection A to the top of the vessel 4; or, steam may be passed either up or down through the fuel bed,—proper respective adjustments of valves 6 and 12 being made,—and "blue" water gas thereby produced. This quantity of steam admitted and "blue" water gas produced being so regulated, by the operator, as to either merely fill the apparatus, or to pass into the gas holder and dilute the oil gas already made to any extent desired.

The word oil will be used in the claims inclusive of tar and other like materials, or mixtures thereof, by the decomposition of which in passing through a bed of burning fuel, oil gas can be made and it is not intended to preclude the passage of steam along with oil from the protection of the claims.

It is evident that by controlling the interval of time in which the oil or tar is subjected to the action of the bed of burning fuel it is possible to make the finished gas more or less rich in hydrogen as may be desired. In some cases, in the second stage of the process, the highly decomposed oil gas produced in the generator 3, can be enriched by the introduction of a suitable hydrocarbon as at 17 into the chamber 4, so that the resultant product is carbureted. Whatever material may be deposited by the decomposition of the oil or tar and that would tend to produce smoke or objectionable fumes when the fire is blown with air, is consumed by the aid of the secondary air, in the vessels 4 and 5, so that such objectionable smoke or fumes are avoided. Moreover there is comparatively little of such material formed, because the decomposition of the oil or tar vapors is thoroughly affected and their conversion into oil gas is comparatively complete. Where steam is passed up through the fuel bed after the passage of oil therethrough, it is evident that there will be less liability to condensation of this steam than if it were admitted to the top of the fire which may have been cooled by the action of the oil. Also the steam if admitted to the bottom of the fuel bed will be decomposed in passing up through the fire and the resulting "blue" gas intensely heated which will enable it to efficiently vaporize any oil remaining on the top of the fuel bed.

What I claim is:

1. The process of making gas which consists in passing air through a burning fuel bed to heat it and generate combustible gas in a generator and passing off said gas to and burning it with secondary air in a chamber to heat the latter, and then passing oil down through the hot fuel bed to generate oil gas and oil vapors and partly decompose them into their elements of which the carbon remains in greater part in the bed and completing this decomposition of the oil vapors and oil gas and the manufacture of gas rich in hydrogen by passing said vapors through said pre-heated chamber.

2. The process of making gas which consists in passing air through a burning fuel bed to heat it and generate combustible gas in a generator and passing off said gas to and burning it with secondary air in a chamber to heat the latter, and then passing oil down through the hot fuel bed to generate and partly decompose oil vapors and finishing the decomposition of the oil vapors and the manufacture of oil gas by passing said vapors through said preheated chamber, and carbureting the oil vapor or gas in said chamber by the addition of hydrocarbon thereto.

3. The process of making gas which consists in passing air through a burning fuel bed to heat it and generate combustible gas in a generator and passing off said gas to and burning it with secondary air in a chamber to heat the latter, and then passing oil down through the hot fuel bed to generate oil gas and oil vapors and partly decompose them into their elements of which the carbon remains in greater part in the bed and completing this decomposition of the oil vapors and oil gas and the manufacture of gas rich in hydrogen by passing said oil gas and vapors through said pre-heated chamber, and passing steam through the fuel bed intermediate of said steps.

In testimony whereof I have hereunto signed my name.

GEORGE H. WARING.

Witnesses:
GEORGE W. CLABAUGH,
J. CHESTER GREY.